United States Patent
Kaufmann et al.

(10) Patent No.: US 10,832,146 B2
(45) Date of Patent: Nov. 10, 2020

(54) SYSTEM AND METHOD OF INFERRING SYNONYMS USING ENSEMBLE LEARNING TECHNIQUES

(71) Applicant: International Business Machines Corporation, Armonk, NY (US)

(72) Inventors: Joseph M. Kaufmann, Austin, TX (US); Lakshminarayanan Krishnamurthy, Round Rock, TX (US); Pablo N. Mendes, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 15/000,582

(22) Filed: Jan. 19, 2016

(65) Prior Publication Data
US 2017/0206453 A1 Jul. 20, 2017

(51) Int. Cl.
*G06N 5/04* (2006.01)
*G06N 20/00* (2019.01)
*G06F 40/30* (2020.01)
*G06F 40/247* (2020.01)

(52) U.S. Cl.
CPC ............ *G06N 5/04* (2013.01); *G06F 40/247* (2020.01); *G06F 40/30* (2020.01); *G06N 20/00* (2019.01)

(58) Field of Classification Search
CPC ..... G06N 5/04; G06N 99/005; G06F 17/2785
See application file for complete search history.

(56) References Cited

U.S. PATENT DOCUMENTS

| | | | |
|---|---|---|---|
| 5,265,065 A | 11/1993 | Turtle | |
| 5,331,556 A | 7/1994 | Black, Jr. et al. | |
| 6,516,312 B1 | 2/2003 | Kraft et al. | |
| 7,346,490 B2 | 3/2008 | Fass et al. | |
| 8,316,007 B2 | 11/2012 | Liao | |
| 2004/0133418 A1* | 7/2004 | Turcato | G06F 17/241 704/9 |
| 2007/0118512 A1 | 5/2007 | Riley et al. | |
| 2011/0103682 A1* | 5/2011 | Chidlovskii | G06K 9/6284 382/159 |
| 2011/0179026 A1 | 7/2011 | Mulligen et al. | |
| 2012/0209852 A1 | 8/2012 | Dasgupta et al. | |

(Continued)

OTHER PUBLICATIONS

Kenter et al. "Short Text Similarity with Word Ennbeddings", CIKM, 2015, pp. 10.*

(Continued)

*Primary Examiner* — Li Wu Chang
(74) *Attorney, Agent, or Firm* — Troutman Pepper Hamilton Sanders LLP

(57) ABSTRACT

Embodiments are directed to a method of utilizing an ensemble of distributional semantics systems in conjunction with a domain term extractor for generating domain-specific synonyms. The method allows for extraction of high-quality, domain-specific synonyms that can be used in an information handling system, such as a question-answer system or in an information retrieval (IR) system, capable of processing natural language. According to embodiments, the domain term extractor identifies the words for which synonyms are sought, and the ensemble of distributional semantics systems determines the synonyms.

14 Claims, 3 Drawing Sheets

(56) References Cited

U.S. PATENT DOCUMENTS

2017/0139899 A1* 5/2017 Zhao .................... G06F 16/313

OTHER PUBLICATIONS

Mena et al., "Domain specific ontologies for semantic information brokering on the global information infrastructure," Formal Ontology in Information Systems, vol. 46, Amsterdam: IOS Press, 1998.
Milne et al., "Mining domain-specific thesauri from Wikipedia: A case study," Proceedings of the 2006 IEEE/WIC/ACM international conference on web intelligence, IEEE Computer Society, 2006.
Buttcher et al., "Domain-Specific Synonym Expansion and Validation for Biomedical Information Retrieval (MultiText Experiments for TREC 2004)," TREC, 2004.
Kietz et al., "Extracting a domain-specific ontology from a corporate intranet," Proceedings of the 2nd Workshop on Learning Language in Logic and the 4th Conference on Computational Natural Language Learning, vol. 7, Association for Computational Linguistics, 2000.
Turcato et al., "Adapting a synonym database to specific domains," Proceedings of the ACL-2000 Workshop on Recent Advances in Natural Language Processing and Information Retrieval: held in conjunction with the 38th Annual Meeting of the Association for Computational Linguistics, vol. 11, Association for Computation Linguistics, 2000.

* cited by examiner

SYSTEM AND METHOD OF INFERRING SYNONYMS USING ENSEMBLE LEARNING TECHNIQUES

TECHNOLOGY FIELD

The present invention relates generally to generating domain-specific synonyms for use in an information handling system, and more particularly to a method of utilizing an ensemble of distributional semantics systems in conjunction with a domain term extractor for generating domain-specific synonyms.

BACKGROUND

Synonyms are often used to enhance search capability in a question-answer system or in an information retrieval (IR) system. Current systems utilize a built-in list of synonyms when answering queries or retrieving information; however, these built-in synonym lists do not work in all domains, resulting in accuracy errors attributable to the systems' lack of knowledge of domain-specific synonyms.

Thus, there is a need for generating domain-specific synonyms. A human created list of domain-specific synonyms is problematic due to expense and time aspects in creating the list. Moreover, it is very unlikely humans could create a comprehensive list of synonyms for a particular domain. A distributional semantics system uses statistics about word distributions to automatically find lists of similar words; however, the results tend to be noisy, leading to a degradation of quality.

This document describes a method of utilizing an ensemble of distributional semantics systems in conjunction with a domain term extractor for generating domain-specific synonyms.

SUMMARY

Embodiments of the present invention provide for generating domain-specific synonyms for identified domain terms of an information source, utilizing an ensemble of distributional semantics systems in conjunction with a domain term extractor.

In an embodiment, a computer implemented method in a data processing system comprising a processor and a memory comprising instructions which are executed by the processor to cause the processor to implement a method for utilizing information sources to identify domain-specific synonyms for an information handling system capable of processing natural language, the method comprises: receiving, by the information handling system, a domain-specific information source; applying, by the information handling system, an algorithm to distinguish between standard terms and domain-specific terms in the domain-specific information source to form a candidate synonym list; applying, by the information handling system, at least two ensemble machine learning techniques to train a synonym finder; and utilizing, by the information handling system, the synonym finder to find synonyms of terms in the candidate synonym list.

In an embodiment, a system for identifying domain-specific synonyms for an information handling system capable of processing natural language, comprises a processor configured to: receive a domain-specific information source; apply an algorithm to distinguish between standard terms and domain-specific terms in the domain-specific information source to form a candidate synonym list; apply at least two ensemble machine learning techniques to train a synonym finder; and utilize the synonym finder to find synonyms of terms in the candidate synonym list.

In an embodiment, a computer program product for identifying domain-specific synonyms for an information handling system capable of processing natural language comprises a computer readable storage medium having program instructions embodied therewith, the program instructions executable by a processor to cause the processor to: receive a domain-specific information source; apply an algorithm to distinguish between standard terms and domain-specific terms in the domain-specific information source to form a candidate synonym list; apply at least two ensemble machine learning techniques to train a synonym finder; and utilize the synonym finder to find synonyms of terms in the candidate synonym list.

According to an embodiment, the at least two ensemble machine learning techniques utilize a first context representation, a second context representation different from the first context representation, a first transformational technique, and a second transformational technique different from the first transformational technique.

In an embodiment, the synonyms are utilized for one or more of a question-answer system and an information retrieval system.

In an embodiment, the algorithm applied to distinguish between standard terms and domain-specific terms comprises one or more of (i) a term frequency-inverse document frequency (TF-IDF) model and (ii) a context representation model.

In an embodiment, the synonym finder comprises at least two distributional semantics systems capable of producing domain-specific synonyms. The at least two distributional semantics systems may comprise one or more of Word2Vec, DiSSect, GLoVE, and Glimpse. Each of the at least two distributional semantics systems may be individually trained, according to an embodiment.

According to an embodiment, applying the at least two ensemble machine learning techniques to train the synonym finder comprises applying crowdsourcing techniques to obtain training data.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
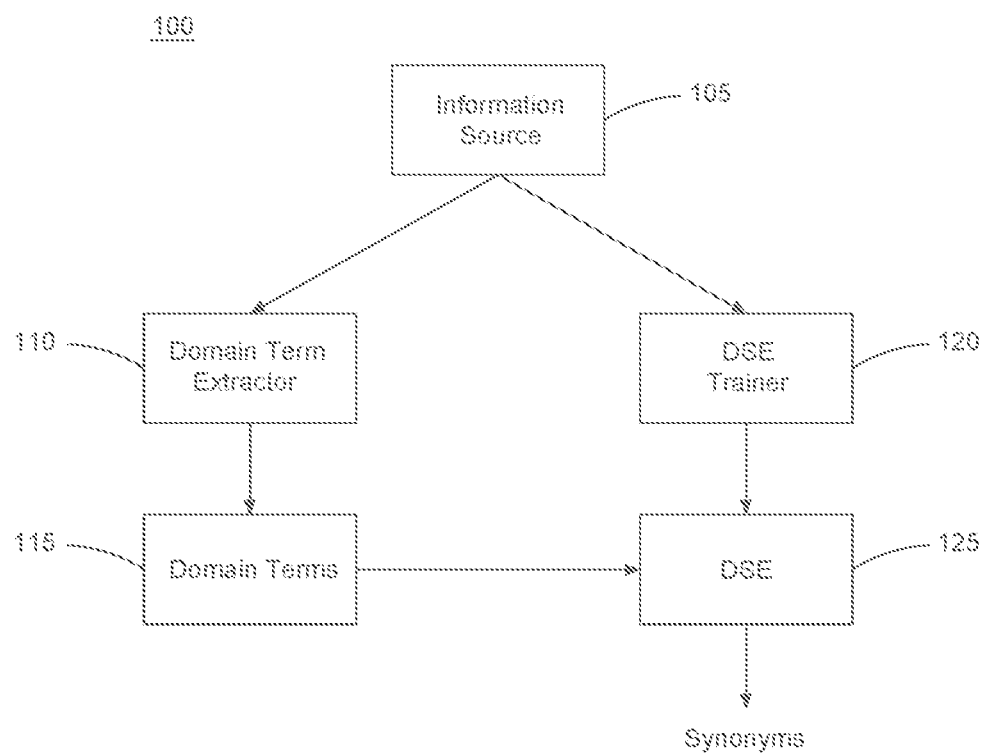
FIG. 1 is a block diagram representation of components and of data flow of an information handling system for generating domain-specific synonyms, according to an embodiment.

Embodiments are directed to a method, system, and computer program product for utilizing an ensemble of distributional semantics systems in conjunction with a domain term extractor for generating domain-specific synonyms. According to embodiments disclosed herein, this allows for extraction of high-quality, domain-specific synonyms that can be used in an information handling system, such as a question-answer system or in an information retrieval (IR) system, capable of processing natural language. According to embodiments, the domain term extractor identifies the words for which synonyms are sought, and the ensemble of distributional semantics systems determines the synonyms.

The present description and claims may make us of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situation awareness that mimic human cognition based on experiences Answer questions based on natural language and specific evidence Embodiments disclosed herein are directed to a method of utilizing an ensemble of distributional semantics systems in conjunction with a domain term extractor for generating domain-specific synonyms. The method, according to embodiments disclosed herein, allows for extraction of high-quality, domain-specific synonyms that can be used in an information handling system, such as a question-answer system or in an information retrieval (IR) system, capable of processing natural language. According to embodiments, the domain term extractor identifies the words for which synonyms are sought, and the ensemble of distributional semantics systems determines the synonyms.

FIG. 1 depicts a block diagram representation of components and of data flow of an information handling system 100 for generating domain-specific synonyms, according to embodiments provided herein. An information source 105 (e.g., a domain-specific information source, an input corpus, a set of texts, and/or the like) is provided, from which synonyms of domain-specific terms are ultimately generated according to embodiments provided herein. There are various uses for the generated synonyms, including, but not limited to, question-answer systems and Internet or other searching mechanisms.

A domain term extractor (DTE) 110 operates to extract domain terms from the information source 105 received by the information handling system 100. In an embodiment, the DTE 110 applies an algorithm to distinguish between standard terms and domain-specific terms. Once the domain-specific terms are identified, a candidate synonym list (i.e., domain-specific terms or domain terms 115) is formed, indicating the terms (or words) for which synonyms are sought.

The DTE 110 is advantageous as it identifies terms for which synonyms are desired. Synonyms are generally not desired or needed for every term or word. For example, some terms do not have useful synonyms (e.g., "the" and "of"). Additionally, to expand every word or term to a synonym may have undesirable effects on the information handling system 100, such as adding too much noise or time.

According to embodiments, various methods and/or algorithms may be utilized by the DTE 110 to extract domain terms from the information source 105. The particular method utilized may be dependent on various factors, such as the type of information source 105. In one embodiment, a term frequency-inverse document frequency (TF-IDF) model may be utilized to find common words in the information source 105. In another embodiment, a method is utilized in which terms specific to a domain are identified by comparing terms of the information source 105 to an open domain source or corpus, such as, for example, Wikipedia. In yet another embodiment of the DTE, context representations of the terms may be used, such as bag of words, n-grams, and token patterns. The DTE is not limited to any particular type of method/algorithm. Rather, various other methods/algorithms, or combinations thereof, as known by those of ordinary skill in the art may be employed.

A distributional semantics ensemble (DSE) trainer 120 operates to train an ensemble of distributional semantics systems (hereinafter referred to as a distributional semantics ensemble (DSE)) so that the distributional semantics systems are capable of producing domain-specific synonyms. To train the DSE, two or more distributional semantics systems are selected. A distributional semantics system may be defined as an algorithm that uses as an input a set of text or a corpus and produces a vector representation for each word in the set of text or corpus. Example distributional semantics systems include, but are not limited to, Word2Vec, DiSSect, GLoVE, and Glimpse.

After training each selected distributional semantics system, the ensemble is trained (by the DSE trainer 120). By utilizing the output of multiple distributional semantics systems, increased accuracy is obtained. For example, each distributional semantics system may have various strengths and weaknesses; one system may be good at finding synonyms which occur near together in text, while another system may use syntactic context to find synonyms that appear in similar syntactic patterns.

In one embodiment, at least two ensemble machine learning techniques are applied to train a synonym finder, which is then utilized to find synonyms of terms in the candidate synonym list. According to an embodiment, the at least two ensemble machine learning techniques utilize a first context representation, a second context representation different from the first context representation, a first transformational technique, and a second transformational technique different from the first transformational technique.

According to an embodiment, the DSE trainer 120 may implement one or more methods for training, depending on various factors such as, for example, the types of selected distributional semantics systems. In one embodiment, crowdsourcing may be used for training. In particular, as one crowdsourcing example, people are asked to evaluate a pair of synonyms (e.g., in the context of a sentence) on a scale of 1-5. Using this training data, the DSE trainer 120 is able to learn to identify the systems that are in line with human judgment. In other embodiments, the training data may come from any type of source. According to an embodiment, the DSE trainer 120 is not training based on domain-specific information but rather the reliability of systems. This advantageously allows for the DSE trainer 120 to be operable on various domains without needing to be retrained.

The domain terms 115 extracted from the DTE 110 are inputted to the DSE 125, which utilizes the training of the ensemble of distributional semantics systems to generate synonyms for the domain terms 115. The results comprise a list of one or more synonyms for all of the domain terms 115 extracted from the information source 105. According to an embodiment, the number of synonyms generated per term may be specified as a configurable parameter, as established by a user or administrator.

As noted above, the resulting synonym lists can be used in various applications, such as a question-answering system such as IBM Watson™. Other uses include, but are not limited to, knowledge graphs, searching (i.e., search engines), and the like.

Figure 2:
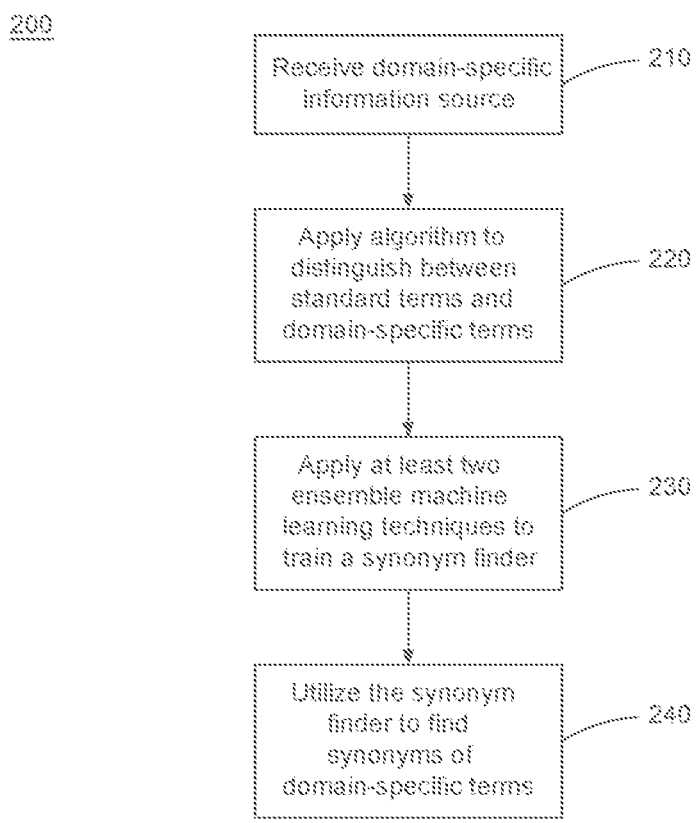
FIG. 2 is a flow chart illustrating a method for utilizing information sources to identify domain-specific synonyms for an information handling system capable of processing natural language, according to an embodiment.

FIG. 2 is a flow chart 200 illustrating a method for utilizing information sources to identify domain-specific synonyms for an information handling system capable of processing natural language, according to an embodiment.

At 210, a domain-specific information source is received by the information handling system 100.

At 220, an algorithm is applied to distinguish between standard terms and domain-specific terms in the domain-specific information source to form a candidate synonym list. With reference to components of the information handling system 100 shown in FIG. 1, the DTE 110 operates to extract domain-specific terms to form the domain term list 115. Various, known methods may be used for the extraction of domain-specific terms.

At 230, the information handling system 100 applies at least two ensemble machine learning techniques to train a synonym finder. The DSE trainer 120 operates to train a DSE so that the distributional semantics systems are capable of producing domain-specific synonyms. To train the DSE, two or more distributional semantics systems are selected.

At 240, the DSE 125 of the information handling system utilizes the synonym finder (i.e., the DSE trainer 120) to find synonyms of terms in the candidate synonym list.

Figure 3:
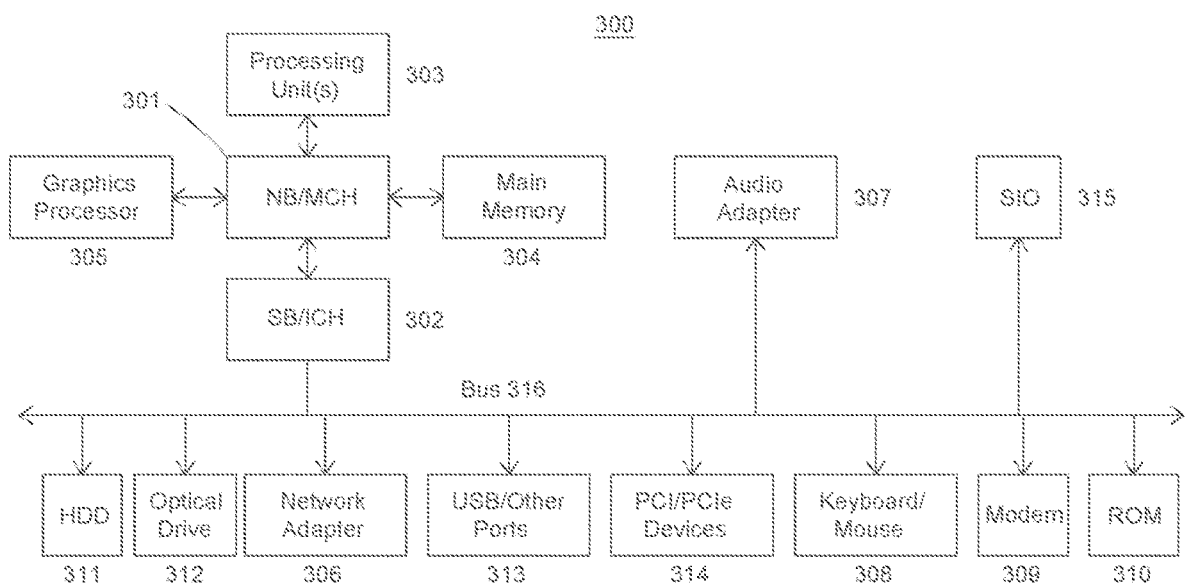
FIG. 3 is a block diagram of an example data processing system in which aspects of the embodiments described herein may be implemented.

FIG. 3 is a block diagram of an example data processing system 300 in which aspects of the illustrative embodiments are implemented. Data processing system 300 is an example of a computer, such as a server or client, in which computer usable code or instructions implementing the process for illustrative embodiments of the present invention are located. In one embodiment, FIG. 3 represents a server computing device, such as a server, which implements the information handling system 100 described herein.

In the depicted example, data processing system 300 can employ a hub architecture including a north bridge and memory controller hub (NB/MCH) 301 and south bridge and input/output (I/O) controller hub (SB/ICH) 302. Processing unit 303, main memory 304, and graphics processor 305 can be connected to the NB/MCH 301. Graphics processor 305 can be connected to the NB/MCH through an accelerated graphics port (AGP).

In the depicted example, the network adapter 306 connects to the SB/ICH 302. The audio adapter 307, keyboard and mouse adapter 308, modem 309, read only memory (ROM) 310, hard disk drive (HDD) 311, optical drive (CD or DVD) 312, universal serial bus (USB) ports and other communication ports 313, and the PCI/PCIe devices 314 can connect to the SB/ICH 302 through bus system 316. PCI/PCIe devices 314 may include Ethernet adapters, add-in cards, and PC cards for notebook computers. ROM 310 may be, for example, a flash basic input/output system (BIOS). The HDD 311 and optical drive 312 can use an integrated drive electronics (IDE) or serial advanced technology attachment (SATA) interface. The super I/O (SIO) device 315 can be connected to the SB/ICH.

An operating system can run on processing unit 303. The operating system can coordinate and provide control of carious components within the data processing system 300. As a client, the operating system can be a commercially available operating system. An object-oriented programming system, such as the Java™ programming system, may run in conjunction with the operating system and provide calls to the operating system from the object-oriented programs or applications executing on the data processing system 300. As a server, the data processing system 300 can be an IBM® eServer™ System P® running the Advanced Interactive Executive operating system or the Linux operating system. The data processing system 300 can be a symmetric multiprocessor (SMP) system that can include a plurality of processors in the processing unit 303. Alternatively, a single processor system may be employed.

Instructions for the operating system, the object-oriented programming system, and applications or programs are located on storage devices, such as the 3DD 811, and are loaded into the main memory 304 for execution by the processing unit 303. The processes for embodiments of the information handling system 100 can be performed by the processing unit 303 using computer usable program code, which can be located in a memory such as, for example, main memory 304, ROM 310, or in one or more peripheral devices.

A bus system 316 can be comprised of one or more busses. The bus system 316 can be implemented using any type of communication fabric or architecture that can provide for a transfer of data between different components or devices attached to the fabric or architecture. A communication unit such as the modem 309 or network adapter 306 can include one or more devices that can be used to transmit and receive data.

Those of ordinary skill in the art will appreciate that the hardware depicted in FIG. 3 may vary depending on the implementation. Other internal hardware or peripheral devices, such as flash memory, equivalent non-volatile memory, or optical disk drives may be used in addition to or in place of the hardware depicted. Moreover, the data processing system 300 can take the form of any of a number of different data processing systems, including but not limited to, client computing devices, server computing devices, tablet computers, laptop computers, telephone or other communication devices, personal digital assistants, and the like. Essentially, data processing system 300 can be any known or later developed data processing system without architectural limitation.

The system and processes of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method in a data processing system comprising a processor and a memory comprising instructions which are executed by the processor to cause the processor to implement a method for utilizing information sources to identify domain-specific synonyms for an information handling system capable of processing natural language, the method comprising:
   receiving, by the processor, a domain-specific information source;
   identifying, by the processor, domain-specific terms to form a candidate synonym list, by comparing each term of the domain-specific information source to an open domain source;
   applying, by the processor, at least two ensemble machine learning techniques to train a synonym finder, wherein the synonym finder is a distributional semantics ensemble comprising at least two distributional semantics systems, wherein each distributional semantics system is trained separately, wherein one distributional semantics system is DiSSect, and another distributional semantics system is Glimpse; and
   utilizing, by the processor, the synonym finder to find synonyms of terms in the candidate synonym list.

2. The method of claim 1, wherein:
   the at least two ensemble machine learning techniques utilize a first context representation, a second context representation different from the first context representation, a first transformational technique, and a second transformational technique different from the first transformational technique.

3. The method of claim 1, further comprising:
   utilizing, by the processor, the synonyms for one or more of a question-answer system and an information retrieval system.

4. The method of claim 1, wherein each of the at least two distributional semantics systems is individually trained.

5. The method of claim 1, wherein the applying of the at least two ensemble machine learning techniques to train the synonym finder comprises applying crowdsourcing techniques to obtain training data.

6. A system for identifying domain-specific synonyms for an information handling system capable of processing natural language, comprising:
   a processor configured to:
      receive a domain-specific information source;
      identify domain-specific terms to form a candidate synonym list, by comparing each term of the domain-specific information source to an open domain source;
      apply at least two ensemble machine learning techniques to train a synonym finder, wherein the synonym finder is a distributional semantics ensemble comprising at least two distributional semantics systems, wherein each distributional semantics system is trained separately, wherein one distributional semantics system is DiSSect, and another distributional semantics system is Glimpse; and
      utilize the synonym finder to find synonyms of terms in the candidate synonym list.

7. The system of claim 6, wherein the processor is further configured to:
   utilize the synonyms for one or more of a question-answer system and an information retrieval system.

8. The system of claim 6, wherein each of the at least two distributional semantics systems is individually trained.

9. The system of claim 6, wherein the applying, by the processor, of the at least two ensemble machine learning techniques to train the synonym finder comprises applying crowdsourcing techniques to obtain training data.

10. A computer program product for identifying domain-specific synonyms for an information handling system capable of processing natural language, the computer program product comprising a computer readable storage medium having program instructions embodied therewith, the program instructions executable by a processor to cause the processor to:
   receive, by the processor, a domain-specific information source;
   identify, by the processor, domain-specific terms to form a candidate synonym list, by comparing each term of the domain-specific information source to an open domain source;
   apply, by the processor, at least two ensemble machine learning techniques to train a synonym finder, wherein the synonym finder is a distributional semantics ensemble comprising at least two distributional semantics systems, wherein each distributional semantics system is trained separately, wherein one distributional semantics system is DiSSect, and another distributional semantics system is Glimpse; and utilize, by the processor, the synonym finder to find synonyms of terms in the candidate synonym list.

11. The computer program product of claim 10, wherein:

the at least two ensemble machine learning techniques utilize a first context representation, a second context representation different from the first context representation, a first transformational technique, and a second transformational technique different from the first transformational technique.

12. The computer program product of claim 10, wherein the program instructions executable by the processor further cause the processor to:

utilize, by the processor, the synonyms for one or more of a question-answer system and an information retrieval system.

13. The computer program product of claim 10, wherein each of the at least two distributional semantics systems is individually trained.

14. The system of claim 6, wherein:

the at least two ensemble machine learning techniques utilize a first context representation, a second context representation different from the first context representation, a first transformational technique, and a second transformational technique different from the first transformational technique.

\* \* \* \* \*